US006892779B2

(12) United States Patent
Masaoka et al.

(10) Patent No.: US 6,892,779 B2
(45) Date of Patent: May 17, 2005

(54) ASSEMBLY OF A PNEUMATIC TIRE AND A RIM, A PNEUMATIC TIRE AND A RIM FOR A PNEUMATIC TIRE

(75) Inventors: Ken Masaoka, Tokyo (JP); Hiroki Sawada, Tokyo (JP); Mitsuo Hashimoto, Tokyo (JP); Yuichiro Ogawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 322 days.

(21) Appl. No.: 09/885,164

(22) Filed: Jun. 21, 2001

(65) Prior Publication Data

US 2002/0062890 A1 May 30, 2002

(30) Foreign Application Priority Data

Jun. 22, 2000 (JP) .................................... P2000-188312
Feb. 27, 2001 (JP) .................................... P2001-051916

(51) Int. Cl.$^7$ ............................. B60C 3/00; B60B 21/00
(52) U.S. Cl. .................... 152/454; 152/375; 152/379.3; 152/379.5; 152/395; 152/396; 152/397
(58) Field of Search ................................. 152/375, 378, 152/379.3, 379.5, 396, 397, 398, 388, 454, 395

(56) References Cited

U.S. PATENT DOCUMENTS 1,903,575 A * 4/1933 Shoemaker .................. 152/539
4,168,732 A * 9/1979 Monzini ...................... 152/452
5,423,366 A * 6/1995 Yamada et al. ............. 152/454
5,665,298 A * 9/1997 Unseld et al. ............... 264/402

FOREIGN PATENT DOCUMENTS

| EP | 0173670 | * | 3/1986 |
| JP | 50-71004 | * | 6/1975 |
| JP | 52-79402 | | 7/1977 |
| JP | 59-53204 | | 3/1984 |
| JP | 03262712 | * | 11/1991 |

OTHER PUBLICATIONS

Mechanics of Pneumatic Tires, United States Department of Commerce, ed. Samuel Clark, pp. 360–372, 1971.*

* cited by examiner

Primary Examiner—Jeff H. Aftergut
Assistant Examiner—Justin Fischer
(74) Attorney, Agent, or Firm—Sughrue Mion, PLLC

(57) ABSTRACT

The invention provides an assembly of a pneumatic tire and a rim. The tire has at least one carcass ply 2 and a belt layer 8. The ply 2 is composed of ply cords and has end portions. The belt layer 8 is composed of belt cords provided outside of the ply 2. Each belt cord extends in a direction intersecting the ply cord. Each of the end portions is held in the rim 12. The width of the tire is maximum in a circumferential cross section "T" with a cylindrical shape with respect to the center axis "D" of the tire. The cross section "T" extends through the rim 10. When the tire is rolled under a load and a stress is applied on the tire as an arrow "X", a neighboring portion 2d near the end portions 2a, 2b is considerably bending-deformed as arrows "Y" to absorb the stress. The roundness of the belt layer 8 is thus preserved to reduce the rolling resistance of the tire considerably.

41 Claims, 23 Drawing Sheets

[Fig.1]
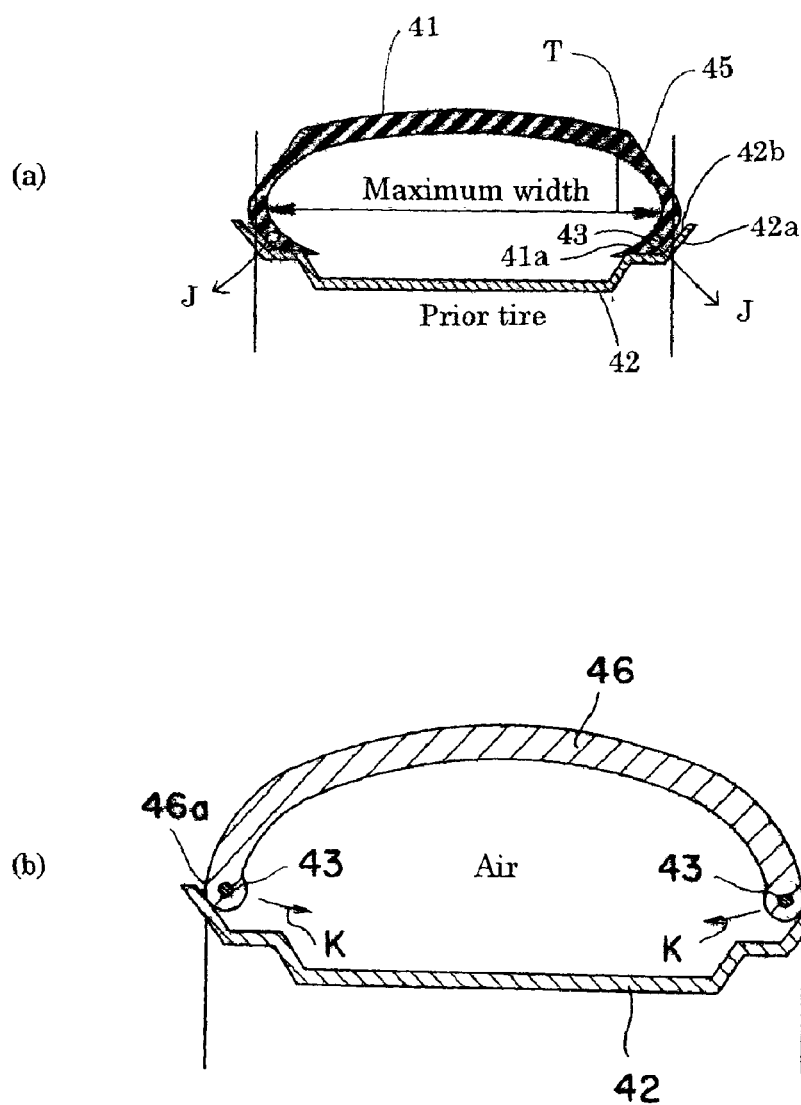

[Fig.2]
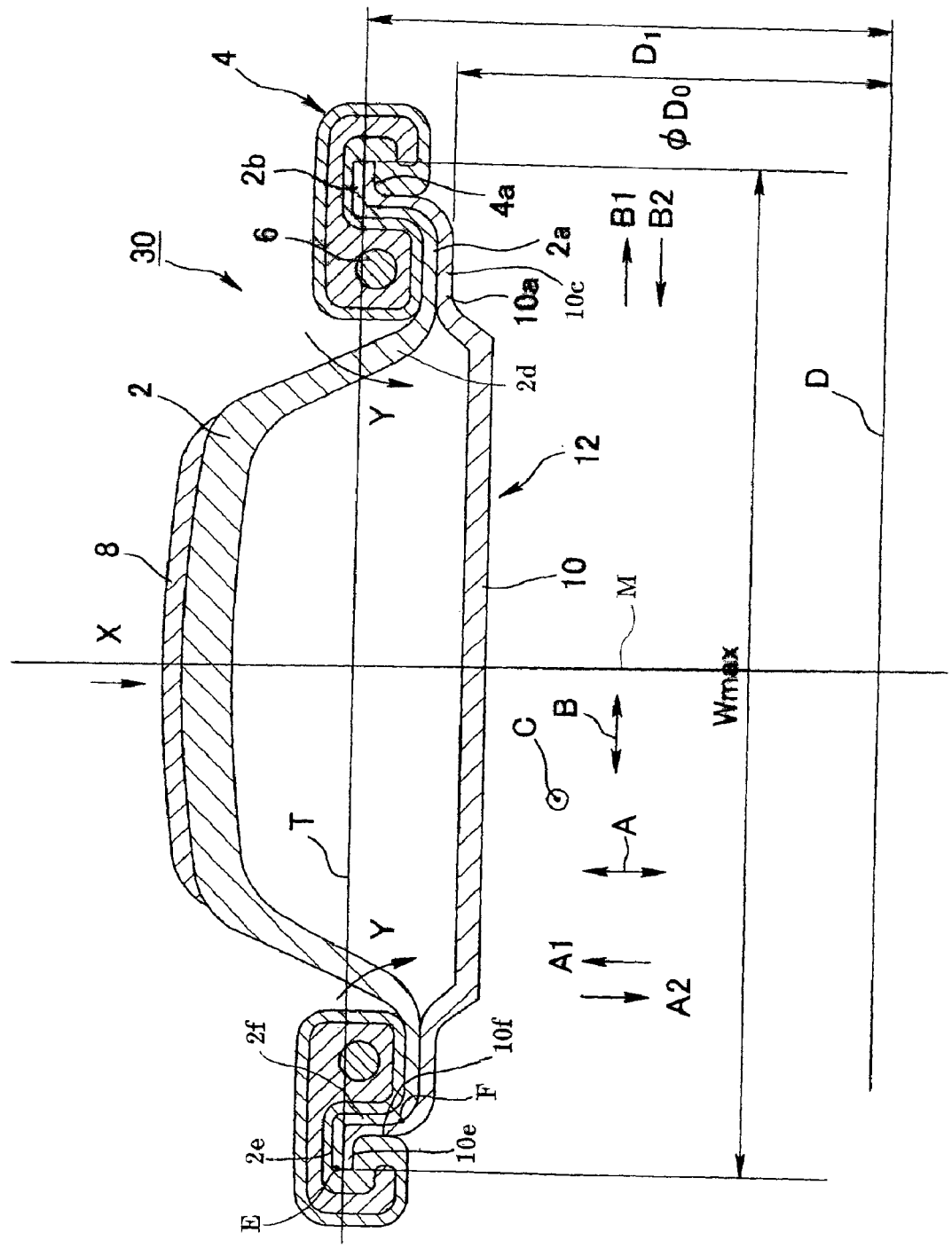

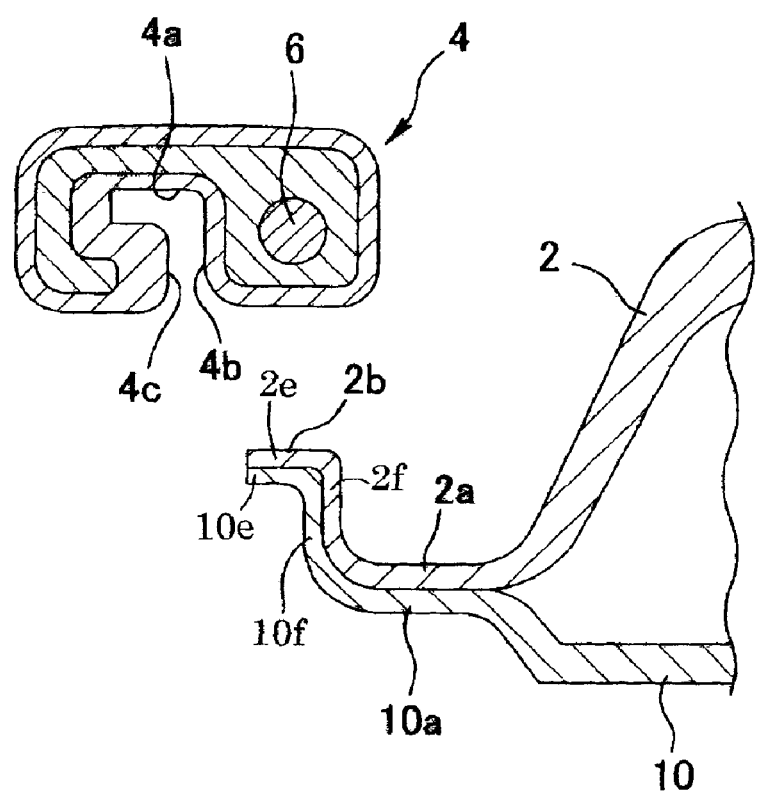
[Fig.3]

[Fig.4]
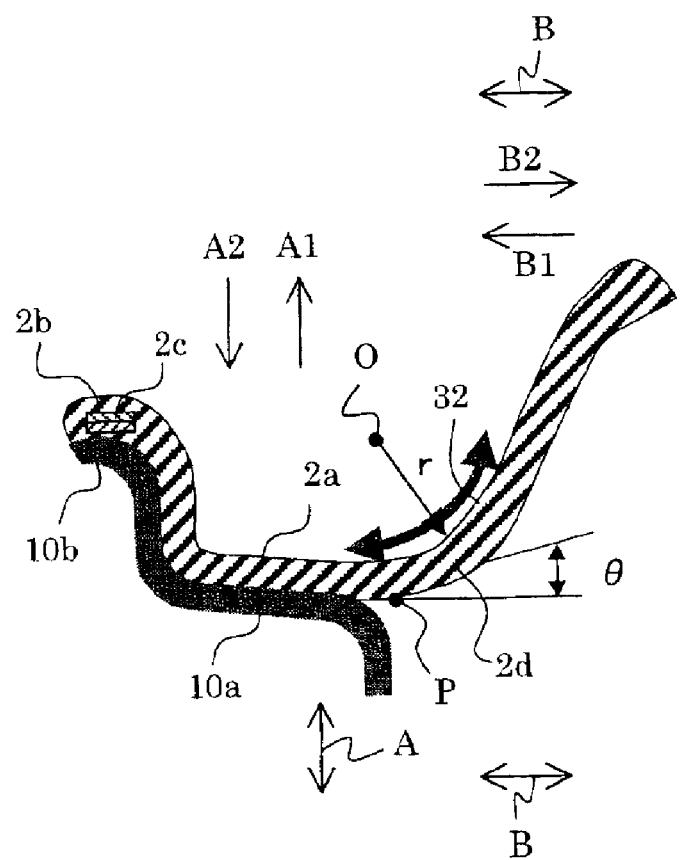

[Fig.5]
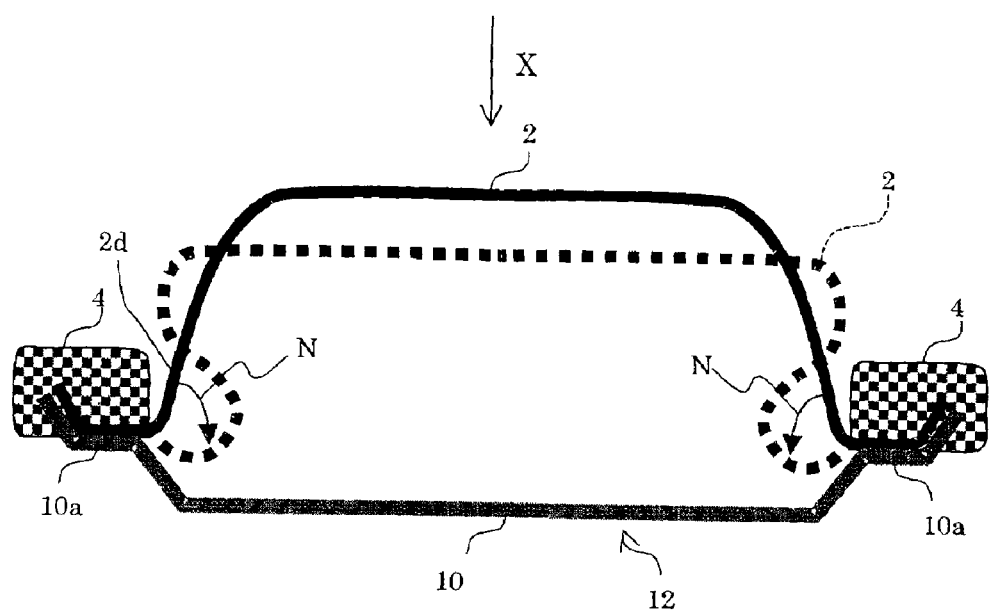

[Fig.6]
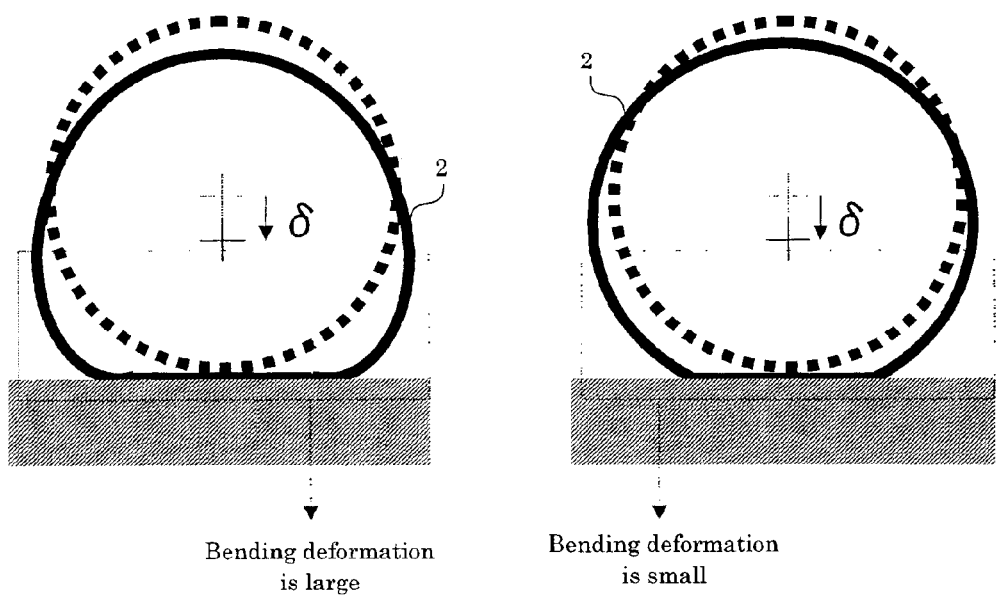
Bending deformation is large
Bending deformation is small

[Fig.7]
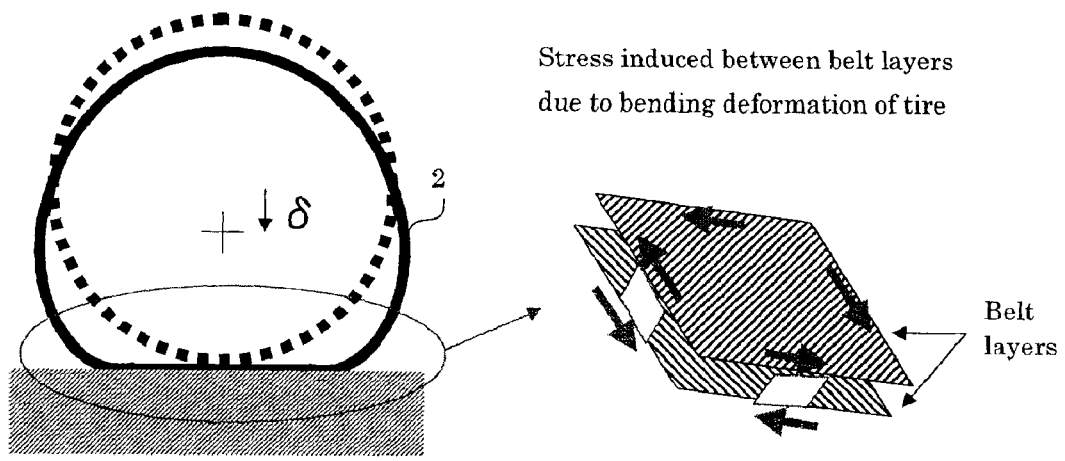

[Fig.8]
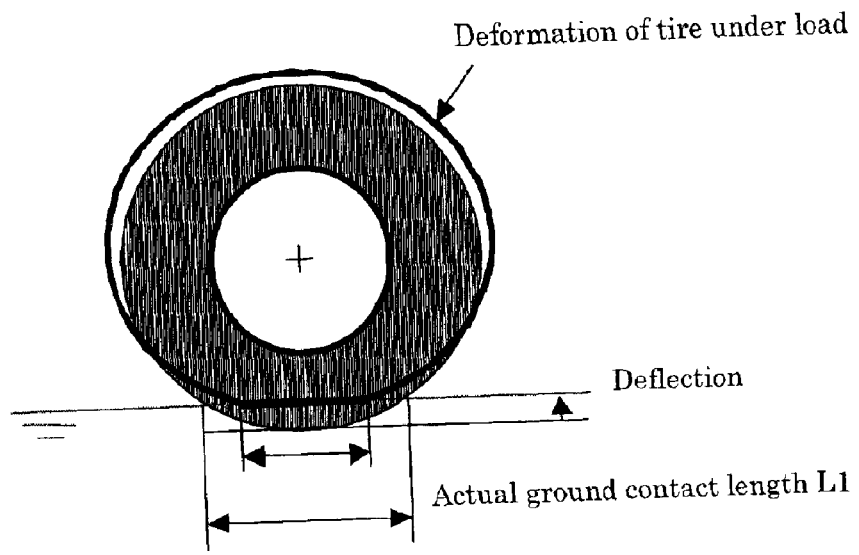
Actual ground contact length L1 is smaller than L0 (when eccentricity is zero) because of eccentricity.

[Fig.9]
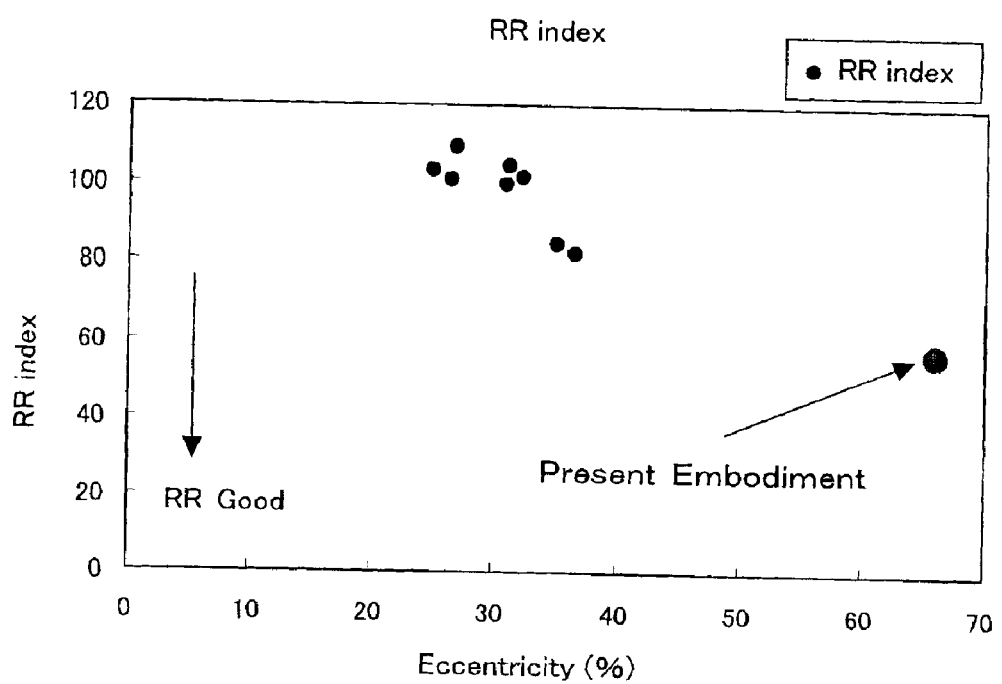

[Fig.10]
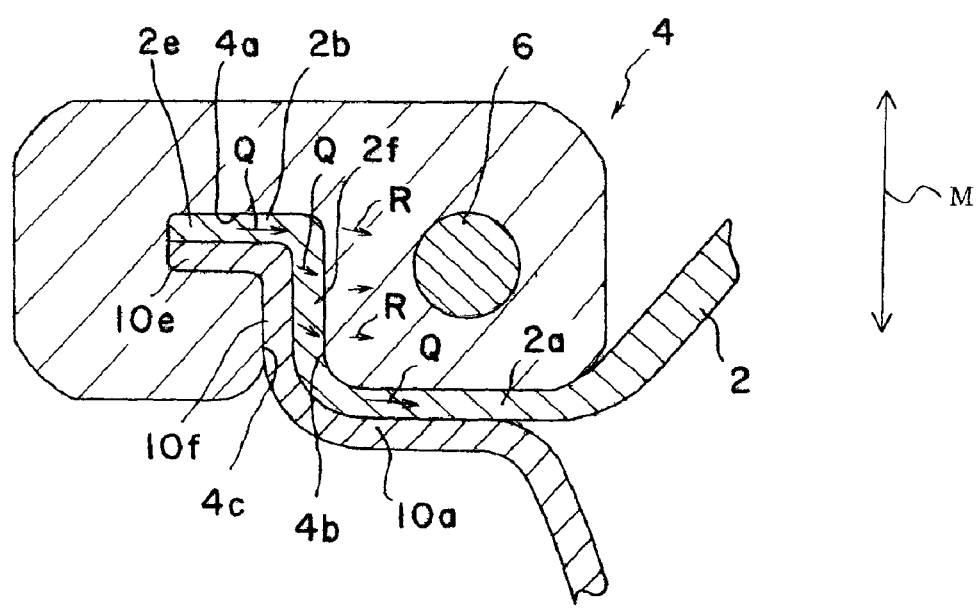

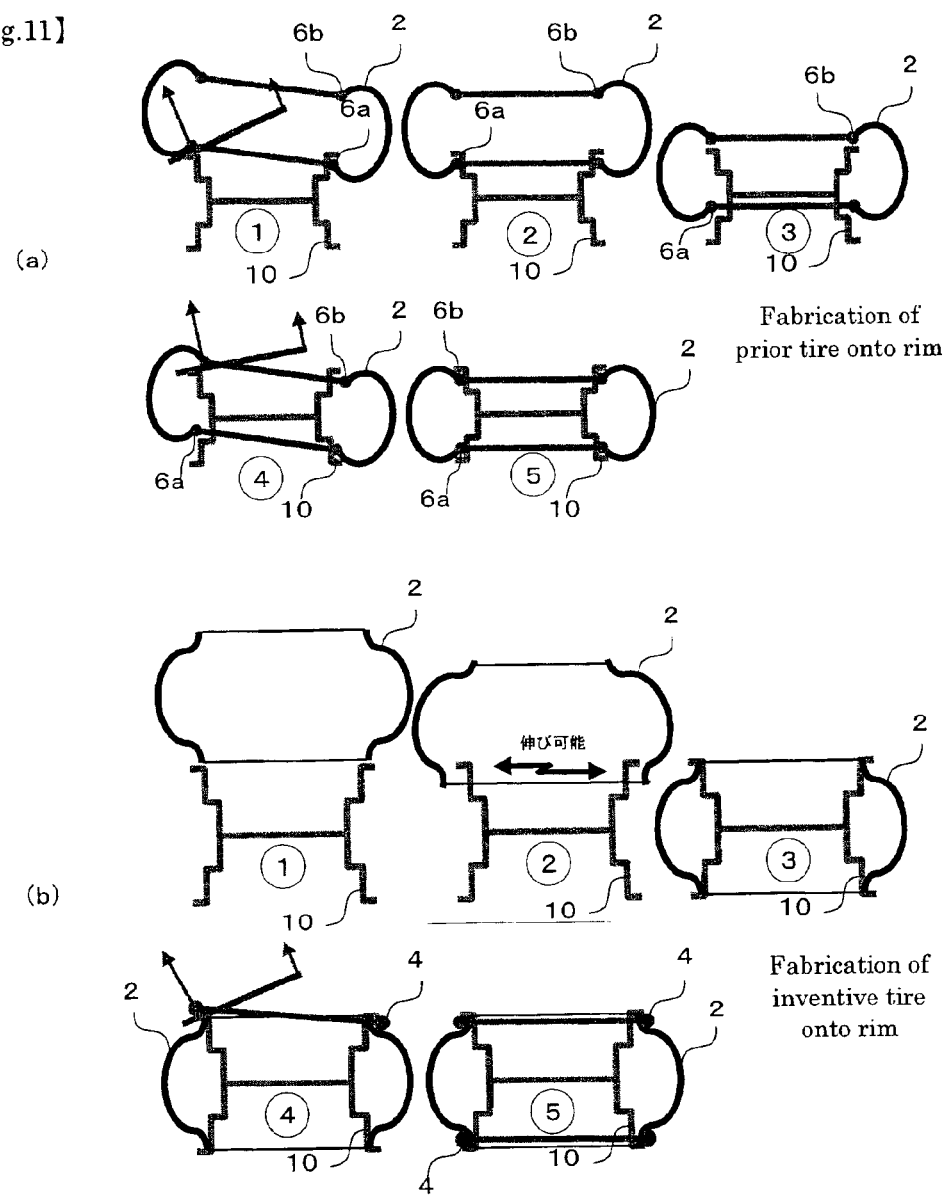

[Fig.12]
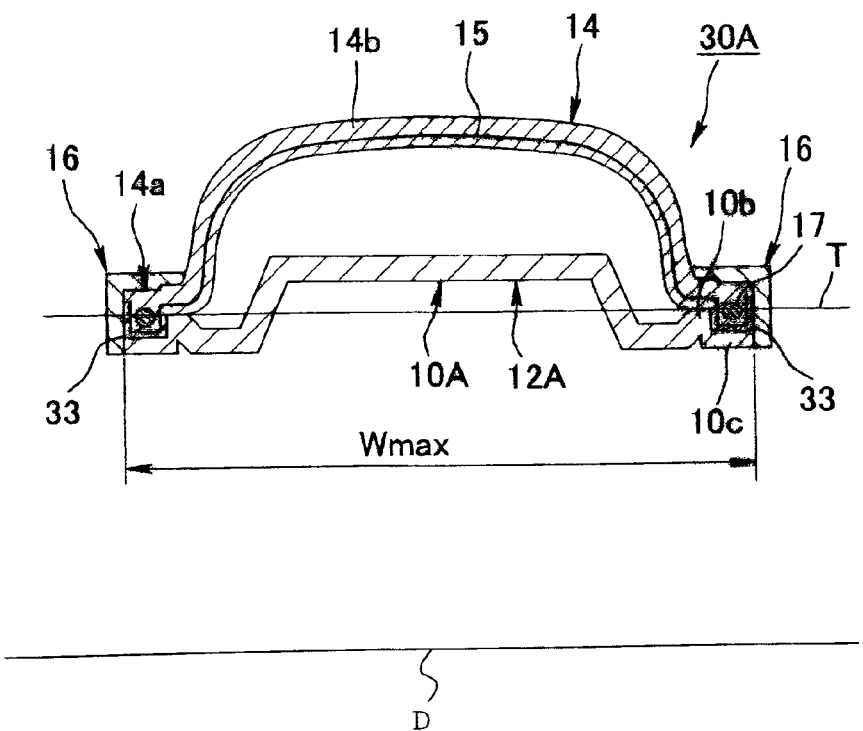

[Fig.13]
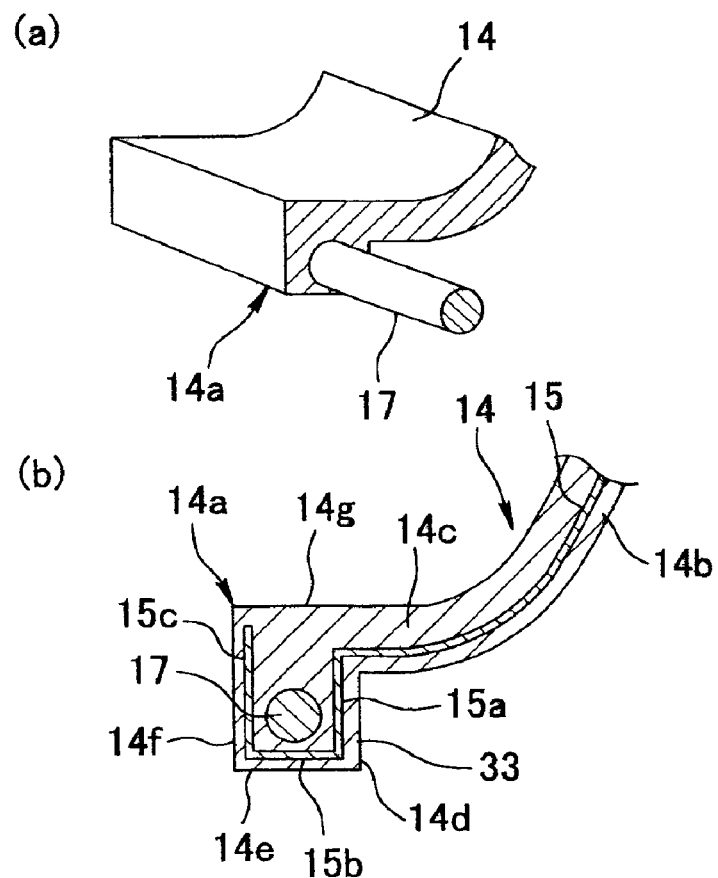

[Fig.14]
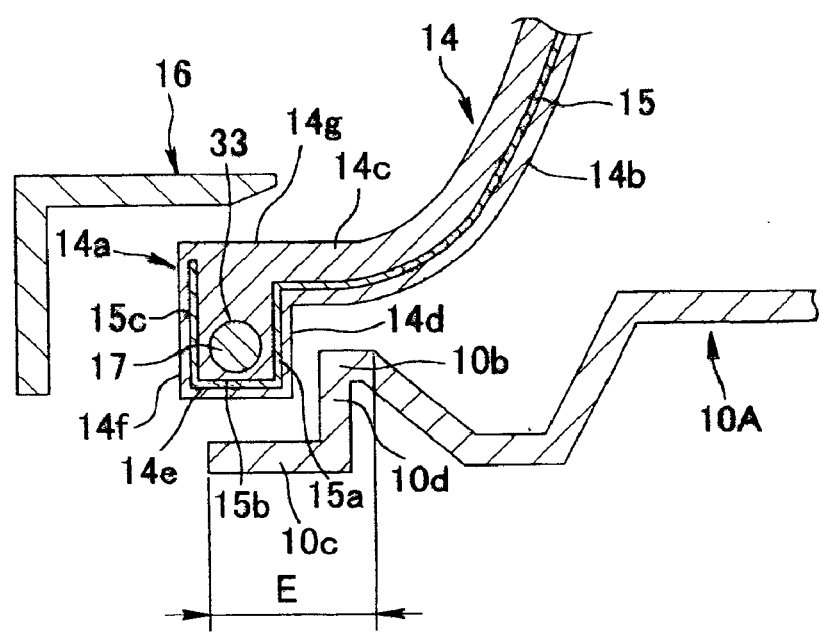

[Fig.15]
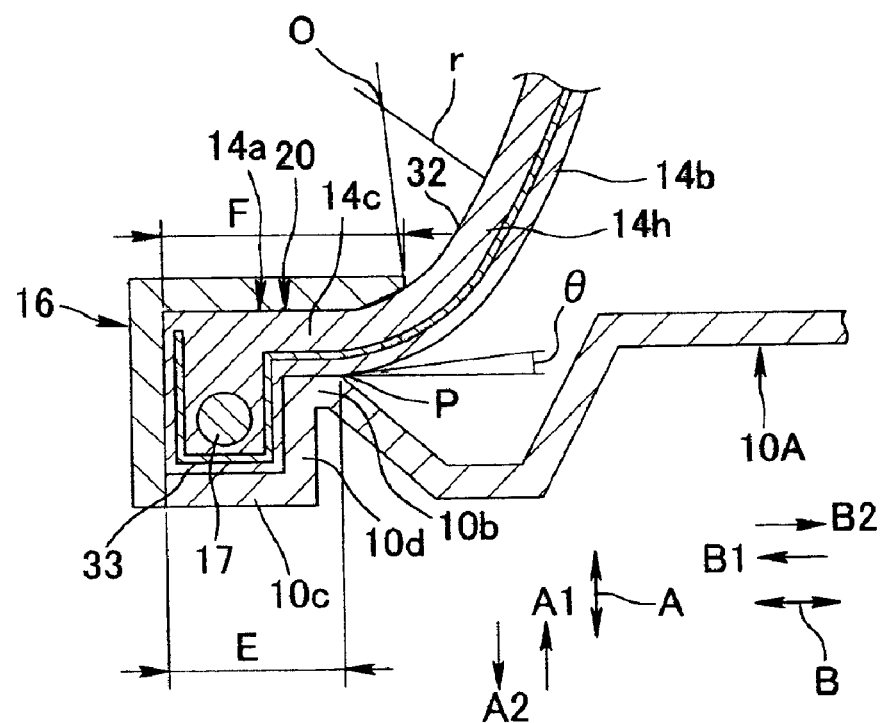

[Fig.16]
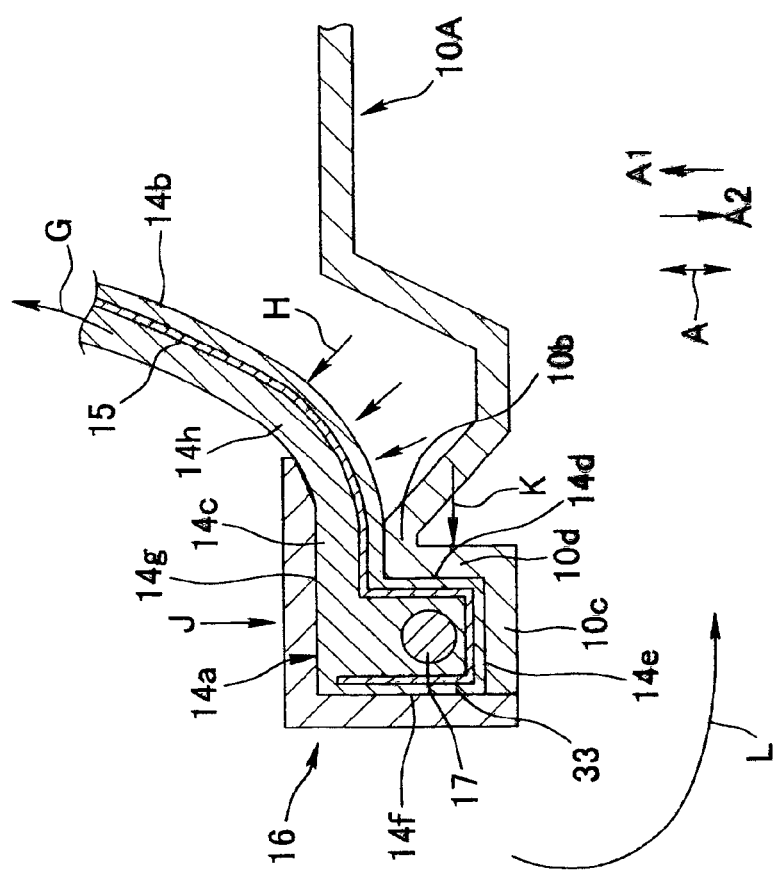

[Fig.17]
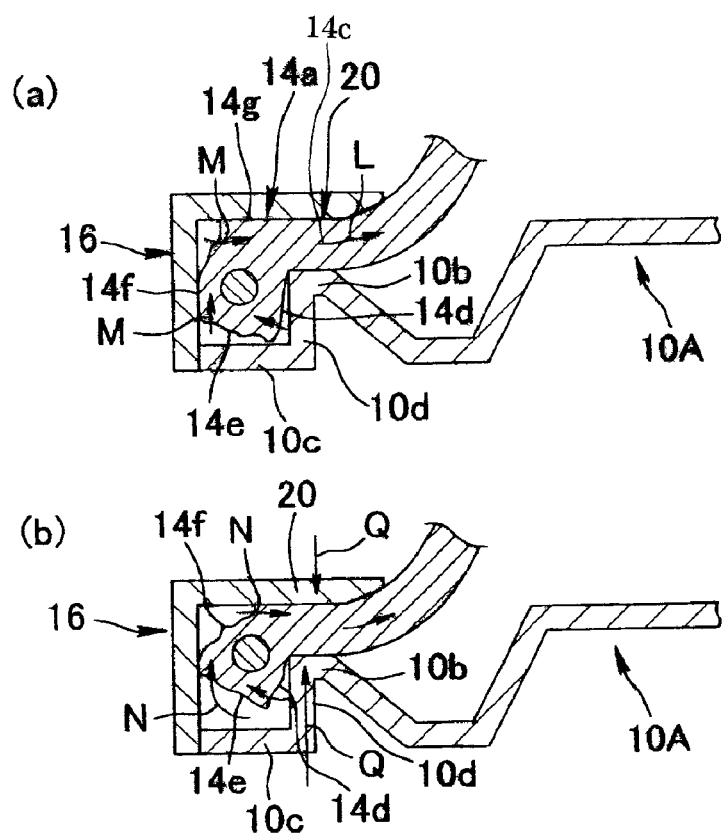

[Fig.18]
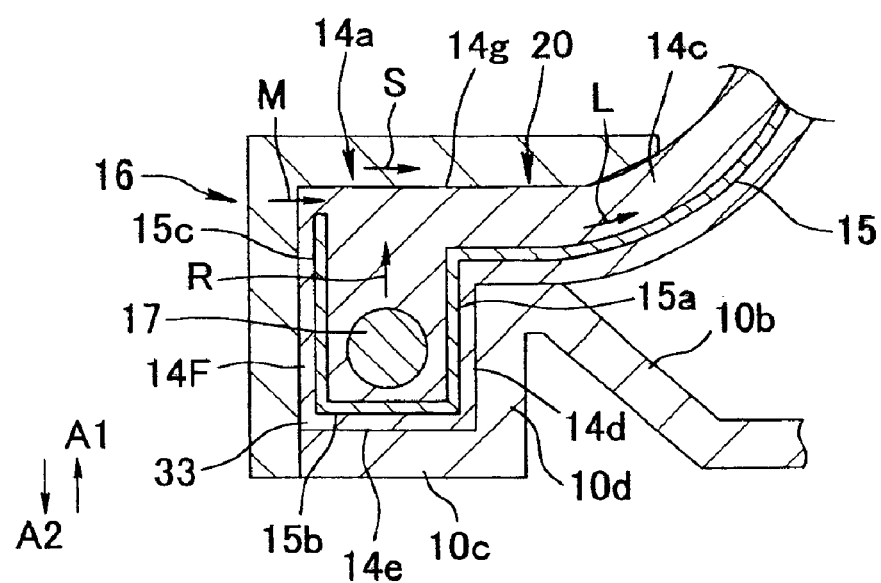

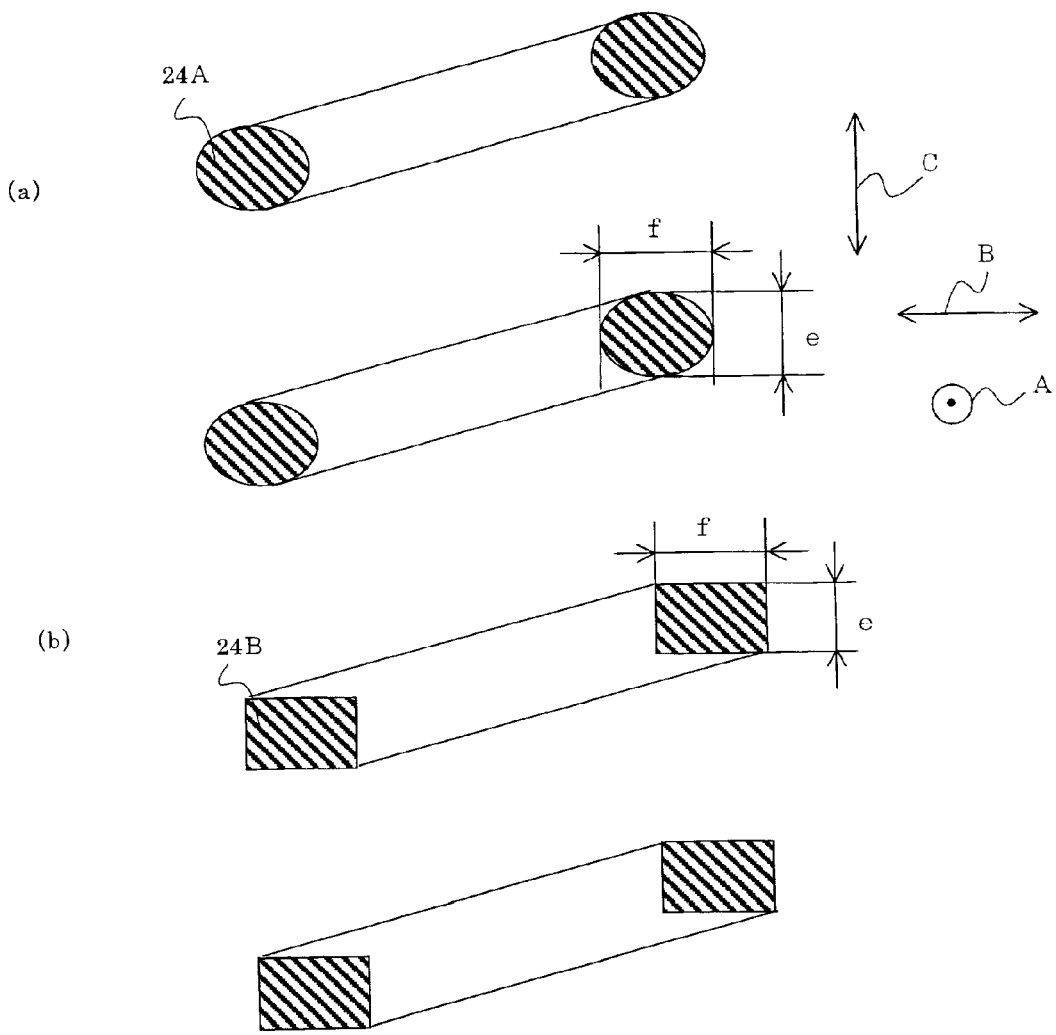
[Fig.19]

[Fig.20]
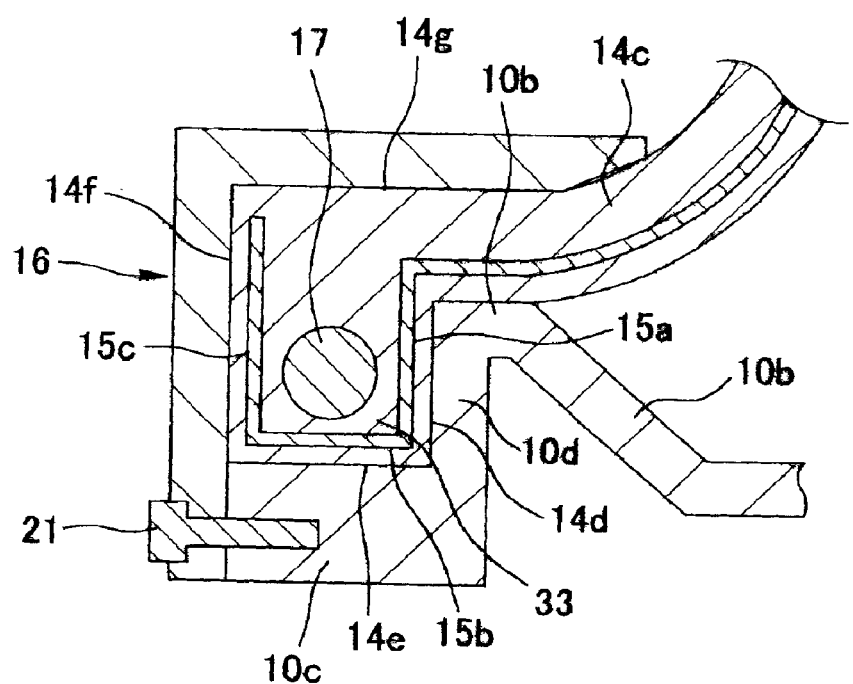

[Fig.21]
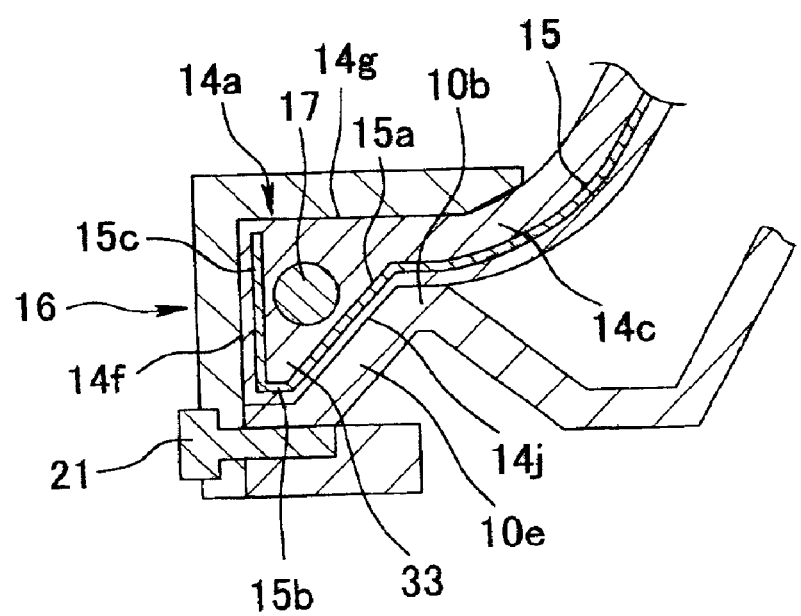

[Fig. 22]
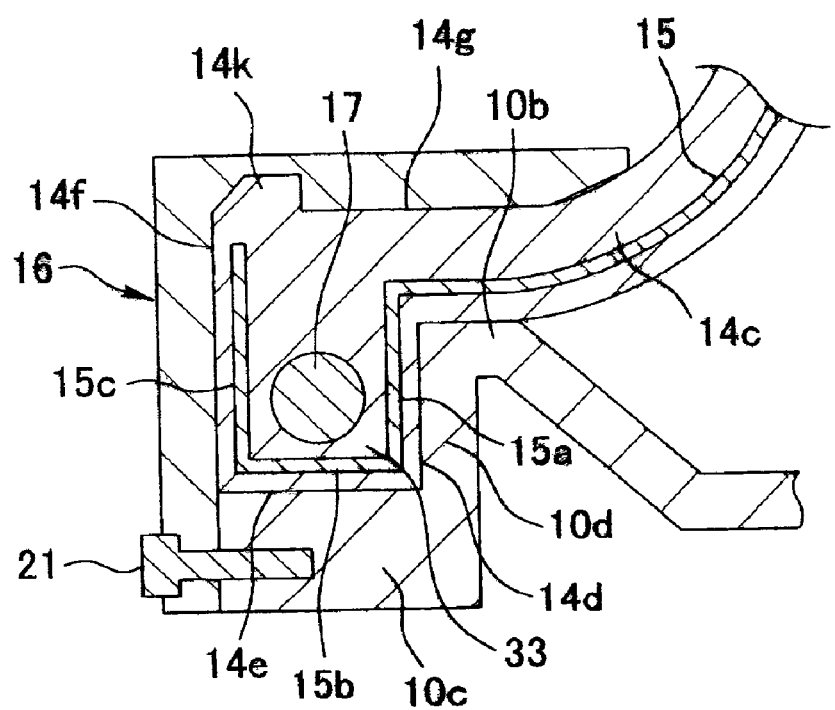

[Fig.23]
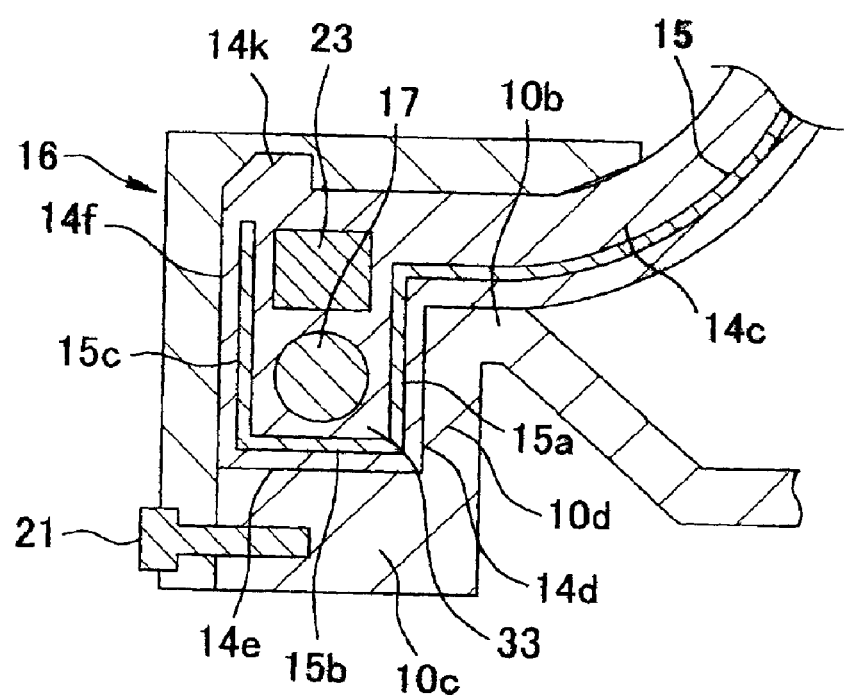

ASSEMBLY OF A PNEUMATIC TIRE AND A RIM, A PNEUMATIC TIRE AND A RIM FOR A PNEUMATIC TIRE

BACKGROUND OF THE INVENTION

1. Field of the Invention

The invention relates to an assembly of a pneumatic tire and a rim, a pneumatic tire and a rim for holding the tire.

2. Related Art Statement

FIG. 1(a) schematically shows a shape of a pneumatic tire 41 of a prior art. As shown in FIG. 1(a), the tire 41 takes its maximum width at a circumferential cross section "T" with respect to the wheel center axis and located in the central portion of the tire. Such conventional tire 41 has two side portions 45 whose radii of curvature are smoothly changed, thereby causing a side tension due to internal pressure of air in the tire. The tire has two bead portions 43 embedded within the end portions 41a thereof. The end portions 41a of the tire 41 were fixed on a rim 42.

As generally understood, a low rolling resistance may be obtained by using a tire with a large value of Tb/Ts, provided that Tb is a belt tension and Ts is a side tension of a tire due to internal pressure of air inflating the tire. In other words, a tire with a high belt tension and a low side tension may be preferably used for reducing the rolling resistance of the tire.

The reasons will be described. An angled belt layer generally used in a conventional radial-ply tire has cross layers and rubber layers sandwiched between the cross layers. The roundness of the belt layer of a tire can be maintained in the region of the tire contacting the ground when the tire rolls on the ground under a load, by improving the belt tension. When the roundness of the belt layer is maintained, the bending deformation of the belt layer from a round shape toward a flat shape is relatively small. Such small bending deformation results in a small shear strain deformation occurred within the rubber layers between the cross layers of the angled belt layer. The shear strain deformation of the rubber layer between the cross layers results in a delay of stress transmission in the rolling tire, due to the viscoelasticity of the rubber layer or the adjacent rubber portion. The delay is one of causes of an increased rolling resistance.

One solution for reducing the rolling resistance is to maintain the roundness of a belt layer when a tire is rolling. Clearly, it is thus preferable to improve Tb and reduce Ts for realizing such deformation preserving the roundness.

Many researches have been conducted for adjusting the cross sectional design of a tire so that a high Tb and low Ts may be realized. For example, a Japanese Patent application publication "Kokai" number 079402/1977 discloses a proposed cross section of a tire for achieving such adjustment.

This publication number 079402/1977 discloses a wheel with a pneumatic tire having tire beads, in which the width of the tire is its maximum near the tire beads.

SUMMARY OF THE INVENTION

The tire described in the publication number 079402/1977 is designed for adjusting the optimal tension distribution, thus providing only moderate and predicable reduction of the rolling resistance which is not necessarily satisfactory.

It is therefore an object of the invention to provide an assembly of a pneumatic tire and a rim capable of reducing the rolling resistance of the tire considerably.

The invention provides an assembly of a pneumatic tire and a rim, said pneumatic tire comprising:

at least one carcass ply composed of a plurality of ply cords and comprising two end portions; and a belt layer composed of belt cords, said belt layer being provided outside of said carcass ply, each belt cord extending in a direction intersecting said ply cord, wherein each of said end portions is held and fixed in said rim and wherein the width of said pneumatic tire is maximum in a circumferential cross section with a cylindrical shape with respect to the center axis of said pneumatic tire, said cross section extending through said rim.

The invention further provides a pneumatic tire to be fixed on a rim, said pneumatic tire comprising:

at least one carcass ply composed of a plurality of ply cords and comprising two end portions; and a belt layer composed of belt cords, said belt layer being provided outside of said carcass ply, each belt cord extending in a direction intersecting said ply cord, wherein the width of said pneumatic tire is maximum in a circumferential cross section (perpendicular to a radial direction) with a cylindrical shape with respect to the center axis of said pneumatic tire, said tire being to be fixed on said rim so that said cross section extends through said rim.

The invention still further provides a rim for fixing a pneumatic tire, said pneumatic tire comprising:

at least one carcass ply composed of a plurality of ply cords and comprising two end portions; and a belt layer composed of belt cords, said belt layer being provided outside of said carcass ply, each belt cord extending in a direction intersecting said ply cord, wherein said rim comprises a main body and at least one separate body for holding at least one of said end portions between said main body and said separate body.

According to the above constructed assembly of a tire and a rim, the end portion of a carcass ply is held and fixed in the rim. The carcass ply has an adjacent portion near the end portion held by the rim and having a relatively small radius of curvature. When the tire is rolling under a load, considerable deformation of the carcass ply takes place within or near the adjacent portion, thus reducing the deformation of the other parts of the carcass ply. It is thereby possible to maintain the roundness of a belt layer, thus considerably reducing the rolling resistance of the tire.

According to one preferred embodiment of the invention, a rim has rim flanges, on which both end portions of a carcass ply is fixed.

According to another preferred embodiment, a rim has a main body and at least one separate body, which together hold the end portion therebetween. Preferably, the main body is provided inside of the carcass ply with respect to the wheel center axis (the center axis of a tire), and at least a part of the separate body is provided outside of the end portion with respect to the (wheel) center axis. More preferably, the rim has one main body (an outer part of the rim) and two ring-shaped separate bodies or fitting members (inner parts of the rim).

Preferably, the main body has two rim flanges, which are surrounded by the separate bodies, respectively. The rim flange of the rim as well as the end portion of the carcass ply may be held within the separate body.

Preferably, the separate body has an aperture, into which the rim flange is inserted and held.

Preferably, the separate body includes bead portions.

Preferably, a reinforcing layer is provided within the outer face of the end portion of the carcass ply. The reinforcing layer may preferably be provided in a direction intersecting the longitudinal direction of the ply cords of the carcass ply. The reinforcing layer may preferably be made of steel cords.

BRIEF EXPLANATION OF THE ATTACHED DRAWINGS

FIG. 1(a) is a cross sectional view schematically showing a conventional pneumatic tire cut along a plane including the wheel center axis of a tire, FIG. 1(b) is a cross sectional view schematically showing another conventional tire, FIG. 2 is a cross sectional view of an assembly of a tire and a rim according to the invention cut along a plane including the center axis, FIG. 3 is a cross sectional view showing a rim and a part of a carcass ply before assembling them, in which a separate body 4 is not fixed to a main body 10, FIG. 4 is an enlarged view schematically showing the assembly including the end portions 2a, 2b and connecting portion of the carcass ply and the end portion 10a, 10b of the main body, FIG. 5 is a diagram schematically showing the shape of carcass ply before and after deformation under a load, in which an adjacent portion 2d near the end portions 2a and 2b is considerably bend and deformed to absorb the stress applied on the carcass ply, FIG. 6 shows diagrams each schematically showing the circumferential deformation of a belt layer, FIG. 7 shows diagrams for schematically illustrating stress-induced deformation of rubber layers between cross layers of an angled belt layer, FIG. 8 is a diagram for explaining the concept of an eccentricity, FIG. 9 is a graph showing the measured eccentricities and RR indexes of the tires of a prior art and the inventive assembly, FIG. 10 is a diagram showing the distribution of forces within a separate body 4 and a main body 10 under a load on the inventive tire, FIG. 11(a) shows diagrams schematically showing the stages of an assembling process of a prior tire to a rim, FIG. 11(b) shows diagrams schematically showing the stages of an assembling process of a tire to a rim according the inventive embodiment, FIG. 12 is a cross sectional view of an assembly according to the invention cut along a plane including the center axis "D", FIG. 13(a) is a partially-broken perspective view showing an end portion 14a and its adjacent region of a carcass ply 14, FIG. 13(b) is a cross sectional view of the end portion 14a and the adjacent region of the carcass ply 14, FIG. 14 is a cross sectional view showing the end portion 14a of the carcass ply 14, a main body 10A and a separate body 16, before the end portion 14a is held between the main body 10A and the separate body 16, FIG. 15 is a cross sectional view showing the end portion 14a of the carcass ply 14 held between the main body 10A and the separate body 16, FIG. 16 is a cross sectional view of the assembly of FIG. 15 for explaining how stress is induced in the assembly when a pneumatic tire is inflated with air, FIG. 17(a) is a cross sectional view of the end portion of the assembly showing the first stage of the pull-out of the bead portion from a rim, FIG. 17(b) is a cross sectional view of the end portion of the assembly showing the second stage of the pull-out of a bead portion from a rim, FIG. 18 is a cross sectional view of an end part of the assembly for explaining how the pull-out of the bead portion from a rim is prevented according to the embodiment of the invention, FIG. 19(a) is a cross sectional view of a metal spring 24A cut along a circumferential cross section with respect to the center axis, FIG. 19(b) is a cross sectional view of a metal spring 24B cut along a circumferential cross section with respect to the center axis, FIG. 20 is a cross sectional view of the end part of another assembly of the invention, in which a bead portion is held between a main body and a separate body, FIG. 21 is a cross sectional view of the end part of still another assembly of the invention, in which a bead portion 14a is held between a main body and a separate body and the bead portion 14a has a protruding portion 33 with a shape similar to a triangle, FIG. 22 is a cross sectional view of the end part of still another assembly of the invention, in which a bead portion 14a is held between a main body and a separate body as shown in FIG. 20 and the bead portion has a protrusion 14k on the surface, and FIG. 23 is a cross sectional view of the end part of still another assembly of the invention. In FIG. 23, a bead portion is held between a main body and a separate body as shown in FIG. 22, and the bead portion has a body 23, made of a hard rubber, embedded within the bead portion.

FIG. 2 is a cross sectional view of an assembly 30 of a tire and a rim according to the invention cut along a plane including the center axis "D". The plane is a radial plane with respect to the center axis "D". The assembly has a carcass ply 2, a belt layer 8 and a rim 12. The carcass ply 2 is made of many ply cords and a ply coating covering the ply cords. Such ply cords and ply coating are not shown in FIG. 2. A belt layer 8 is provided on the outer surface of the carcass ply 2. The belt layer 8 is composed of many belt cords. Each belt cord extends in a direction intersecting the longitudinal direction of each ply cord, preferably at a right angle.

As shown in FIG. 2, the carcass ply 2 has a main portion, on which the belt layer 8 is provided, and two end portions 2b inserted into separate bodies 4, respectively. The carcass ply 2 also has two end portions 2a, which are not inserted into the separate bodies 4. The end portion 2a extends in the direction "B" of tire width between the separate body 4 and main body 10.

The carcass ply 2 is attached on a rim 12 having one main body 10 and two separate bodies 4. More specifically, the end portions 2a and 2b of the carcass ply 2 are held and clamped between the main body 10 and the separate bodies 4 to fix the carcass ply 2 to the rim 12.

The concrete or mechanical methods for holding the end portions of a carcass ply within a rim are not particularly limited. However, it is necessary to hold or grasp or clamp the end portions of the carcass ply at a sufficiently high pressure so that the end portions are not pulled out from the rim when the tire is rolling.

As shown in FIG. 4, a reinforcing layer 2c is embedded within the inserted end portion 2b. The reinforcing layer 2c is made of many steel cords, which extend in a direction intersecting the longitudinal direction of the ply cord, preferably at a right angle.

The main body 10 has two rim flange portions 10a which are arranged inside "A2" of the carcass ply with respect to the wheel center axis and contacted with the inner sides of the end portions 2a and 2b. Two separate bodies 4, each having a shape of a ring, are arranged and surround the end portions 2a and 2b of the carcass ply and the rim flanges 10a, respectively. One aperture 4a is provided in each separate body 4. The end portions 2a and 2b of the carcass ply 2 are mounted and laminated on the rim flange portion 10a of the main body 10. The rim flange portion 10a may be divided into three parts: a supporting part 10c; a first inserted part 10f; and a second inserted part 10e. The supporting part 10c is not inserted into the aperture 4a. The first inserted part 10f extends in a direction substantially parallel with the central plane "M" perpendicular to the center axis "D". The second inserted part 10e extends in a direction substantially parallel with the center axis "D".

The end portion 2b of the carcass ply 2 may be divided into two parts: a first inserted part 2f and a second inserted part 2e. The first inserted part 2f extends in a direction substantially parallel with the central plane "M". The second inserted part 2e extends in a direction substantially parallel with the center axis "D".

The rim flanges 10a of the main body 10 and the end portions 2b are inserted into the apertures 4a. Each inner end portion 2a, which is not directly inserted into the apertures 4a, is sandwiched and held between the inner side (A2 side) of the separate body 4 and the outer side (A1 side) of the main body. Therefore, both end portions 2a and 2b are held and fixed in the rim 12 composed of the separate body 4 and main body 10.

As shown in FIG. 2, "F" is a inlet point of each aperture or recess 4a and "E" is a endmost point of the aperture. "F" may preferably be located at a position nearer to the center axis "D" and the central plane "M" than the point "E". A line drawn between "F" and "E" may preferably be inclined to the plane "M" and center axis "D".

Further, as shown in FIG. 3, the separate body 4 may be separated and removed from the main body 10. Once the separate body 4 is removed, it is possible to attach the body 4 to the main body 10 again.

The radius of the supporting part 10c of the flange 10a, which is not inserted into the aperture 4a and supports the end portion 2a, is "D0". The radius of the flange 10a may preferably be increased at its outermost point, compared to "D0". In the assembly shown in FIG. 2, the second inserted part 10e of the flange portion 10a has a radius of "D1", which is greater than "D0".

The separate body 4 has a bead portion 6 embedded therein. The bead portion 6 is embedded at a position inside B2 of the aperture in the direction "B" of tire thickness. The bead portion is nearer to the central plane "M" than the aperture 4a. The thickness of the carcass ply 2 takes its maximum "Wmax" on the rim 12, as shown in FIG. 2. This will be explained more in detail. There are many circumferential cross sections, each having a cylindrical shape, with respect to the center axis "D". Each circumferential cross section surrounds the center axis "D". Such circumferential cross sections have different radii with respect to the axis "D". Some circumferential cross sections pass through the rim 12 (that is, both/either of main body 10 and/or separate body 4). For example, a circumferential cross section with a radius of "D0" does not lie on the rim 12 and a circumferential cross section with a radius "D1" lies on the rim (its separate body 4). There are also many radial directions with respect to the center axis "D". "A" is one of such redial directions. In the cross section cut along one radial plane including the center axis "D", as shown in FIG. 2, the radial direction "A" included in the cross section is perpendicular to each of the circumferential cross sections. The circumferential cross section includes a circumferential cross section "T" in which the width of the carcass ply takes its maximum (Wmax).

The circumferential cross section "T" is perpendicular to the radial direction "A" as shown in FIG. 2 and has a shape of a cylinder as a whole.

The maximum width of a pneumatic tire means the maximum width of its rubber structure constituting the tire, excluding a rim on which the rubber structure is fixed. For example, in the example of FIG. 2, the maximum width of the pneumatic tire equals with a distance between the end portions 2b of the carcass ply 2. However, they are not necessarily the same.

Many circumferential cross sections "T", in which the width of a pneumatic tire takes its maximum, may exist depending on the outer shape of the tire. In this case, one or more of the circumferential cross section, in which the width takes its maximum, may be on a rim, and the other circumferential cross sections may not be on the rim. At least one circumferential cross section "T" should be on a rim for satisfying the requirements of the present invention. Most preferably, substantially all the circumferential cross sections "T", in which the width of a tire takes its maximum, lie on a rim.

In a preferred embodiment, a carcass ply has a neighboring portion, which is adjacent to the end portion of the carcass ply and is not held within a rim. The neighboring portion has an outer surface whose center of curvature, viewed in a cross section perpendicular to the circumference of a tire, is located outside of the carcass ply with respect to the center axis "D" of a tire. The cross section includes the center axis.

For example, as shown in FIG. 4, the end portions 2a and 2b are curved near the bead portion 6. The carcass ply 2 has a neighboring portion 2d, which is adjacent to the end portions 2a and 2b and is not held within a rim 12. The neighboring portion 2d has an outer surface 32 whose center of curvature "O", viewed in a cross section perpendicular to the circumference of the tire, is located outside (A1 side) of the carcass ply 2 with respect to the center axis "D". The radius of curvature "r" is relatively small.

Moreover, a starting angle θ may preferably be relatively small. In the embodiment shown in FIGS. 2 and 4, the starting angle θ is substantially zero. The carcass ply 2 extends in a direction substantially parallel with the direction "B" of tire thickness (parallel with the center axis "D"). The starting angle θ is defined as a angle between the curve of the inner surface of the carcass ply 2 and the direction of tire thickness "B", measured at a point "P" where the carcass ply and rim are separated (where they meet).

In a preferred embodiment, the radius of curvature "r" may preferably be not larger than 50 mm and more preferably be not larger than 30 mm for causing considerable bending-deformation within the neighboring portion 2d.

In a preferred embodiment, the angle θ may preferably be not larger than 45° and more preferably be not larger than 10° for causing considerable bending deformation within the neighboring portion 2d.

In another preferred embodiment, a main body 10 (the lower or inside portion of a rim) is a rim designed according to an industrial standard. The standard is defined and effective in each region where a tire is produced or used, and different standards may be applied in different regions. For example, for defining the Industrial standards, "Year Book" published by "The Tire and Rim Association Inc." is used in the United States. "Standards Manual" published by "The European Tire and Rim Technical Organization" is used in Europe and "JATMA Year Book" published by "The Japanese Automobile Tire Association" is used in Japan.

In the assembly of the embodiment of the invention, the width of the carcass ply 2 takes its maximum "Wmax" on the rim 12, and the end portion of the carcass ply is fixed by holding the end portion within the rim. As shown in FIG. 2, the carcass ply has a region (such as the neighboring portion 2d), near the point "P" where the rim and the carcass ply meet. Such region has a relatively small radius of curvature "r". When the tire is rolled under a load and a stress is applied on the tire as an arrow "X", the region with a relatively small radius of curvature "r", such as the neighboring portion 2d, is considerably bending-deformed to absorb the stress. Consequently, as arrows "Y" in FIG. 2, the neighboring portion near the point "P" where the carcass ply meets the rim is considerably deformed. Such type of the bending-deformation is effective for preserving the roundness of the belt layer 8.

Particularly in the present embodiment, as shown in FIG. 4, the neighboring portion 2d extends in a direction substantially parallel with the center axis "D" from the point "P". Moreover, the center of curvature "O" of the curve of the outer surface 32 exists outside of the carcass ply with respect to the center axis. The radius of curvature "r" is relatively small. In other words, the slope of the curve 32 is relatively small.

By applying such shape, as shown in FIG. 5, when a stress is applied on the tire an arrow "X", the outer surface of the carcass ply is pushed toward the center axis "D". FIG. 5 shows the approximate shapes of a carcass ply 2 before applying the stress (represented by a solid line) and deformed carcass ply 2 after applying the stress (represented by broken lines). The neighboring portions 2d (or near), adjacent to the end portions 2a and 2b, are considerably bending-deformed as arrows "N". The resistance of the neighboring portion 2d against the bending deformation toward the center axis is relatively small, because of the following reasons.

1. The angle θ is relatively small.
2. The center of curvature "O" exists outside of the carcass ply with respect to the center axis of a tire.
3. The slope of the curve 32 is relatively small.

Therefore, the neighboring portion 2d or near may be easily bent with the point "P" as its fulcrum, when a stress is applied on the outer surface of the carcass ply 2 as an arrow "X". Such considerable deformation of the neighboring portion absorbs the stress applied on the tire to reduce the deformation of the other parts of the carcass ply. It is thereby possible to preserve the roundness of the belt layer 8 as a whole of the tire.

FIG. 6 shows diagrams for explaining the relationship between the roundness of a belt layer and the bending deformation thereof. In the left diagram of FIG. 6, the roundness of a belt layer 8 is not preserved and the bending deformation is relatively large. In the right diagram of FIG. 6, the roundness of the belt layer is preserved and the overall bending deformation is relatively small. A conventional belt layer for a radial-ply tire has an angled belt layer having cross layers and rubber layers sandwiched between the cross layers. As shown in FIG. 7, when the bending deformation is reduced, the stress-induced deformation within the rubber layers is also reduced. Such strain-induced shear deformation of the rubber layers between the cross layers results in a delay of stress transmission in the rolling tire, due to the viscoelasticity of the rubber layer or the adjacent rubber portion of the tire. The delay results in an energy loss, which is one of causes of an increased rolling resistance.

Therefore, one solution for reducing the rolling resistance is to maintain the roundness of a belt layer 8 when a tire is rolling. It is thus possible to reduce the rolling resistance by using the inventive assembly of a tire and a rim by preserving the roundness of the belt layer.

For proving that a rolling resistance is reduced in the assembly according to the embodiment of the invention, an eccentricity is defined and the eccentricities and RR indexes of a conventional tire and the inventive tire are measured. The "RR index" is the abbreviation of a "rolling resistance (RR) index".

First, an eccentricity is defined referring to FIG. 8. That is, the eccentricity is defined as (L0−L1)/L0, provided that "L0" is a ground contact length when no eccentricity exists and "L1" is a ground contact length of a tire in use. When a load is applied on a tire, the tire is decentered and "L1" becomes smaller than "L0". The eccentricities and RR indexes of a conventional tire and a tire used in the inventive assembly were measured and plotted on a graph shown in FIG. 9.

As seen from FIG. 9, the inventive assembly of a tire and a rim provides a larger eccentricity and smaller RR index (meaning smaller rolling resistance) than a conventional tire.

The pneumatic tire disclosed in Japanese patent application publication "Kokai" 079402/1977 was described briefly in "Related Art Statement" section in this specification. Such tire further presents a possibility of inadequate fitting of a tire to a rim in some cases. The reasons will be explained below.

As in FIG. 1(a), a conventional tire 41 takes its maximum width at a circumferential cross section "T" located in the central portion of the tire 41. When the tire 41 is inflated with air to increase the inner pressure of the tire, such inner pressure forces the bead portions 43 to move outwardly as arrows "J". Therefore, the rim 42 is provided with rim flanges 42a, whose inner surfaces 42b are contacted with the outer surfaces of the end portions 41a of the tire 41. When the end portion 41a and bead portion 43 embedded within the end portion are forced to move outwardly due to air pressure, the outer surface of the end portion 41a is pressed onto the inner surface 42b of the rim flange 42a, so that the outward movement is prevented. The pressure between the outer surface of the end portion 41a or the bead portion 43 and the inner surface 42b of the rim flange 42a may provide the secure fitting of the tire and rim and secure sealing of the inner air pressure of the tire. However, as schematically shown in FIG. 1(b), the width of the tire 46 takes its maximum within a circumferential cross section extending through its bead portions 43. The tire 46 does not have side portions with a relatively large thickness. Therefore, when the tire 46 is inflated with air to increase its inner pressure, such inner pressure forces the bead portions 43 to move inwardly as arrows "K". A conventional rim constructed according to an industrial standard does not have an appropriate part to contact with the inner surface of the end portion 46a and receive the pressure from the bead portion 43. It is therefore difficult to secure the firm fitting and sealing of the inner pressure between the tire 46 and a conventional rim 42 generally used.

One way to solve the problem is to modify the shape of a rim for the pneumatic tire disclosed in the Japanese patent publication. However, such modification of a rim is impractical, because such modified rim will be out of industrial standards now prevailing. It is desired to make use of rims conventionally sold and used, which are designed according to conventional industrial standards.

On the other hand, in the inventive embodiment of the assembly, the separate body 4 with a bead portion 6 has a shape and structure designed so that the separate body 4 may be mechanically fitted onto the main body 10 without relying upon the inner pressure of air. That is, the separate body 4 is separated from the tire carcass and has a shape of a ring with an aperture 4a formed therein. Such separate body 4 may be fitted to the main body 10 of the tire carcass using the aperture 4a.

In the present embodiment shown in FIG. 10, the separate body 4 is provided with an aperture 4a for fixing the carcass ply 2 onto the rim main body 10. When the tire is inflated with air or a load is applied on the tire or the tire is rolled on the ground, the end portions 2a and 2b are pulled inwardly as arrows "Q" along the outer surface of the rim flange 10a. The inserted parts 2e and 2f of the end portion 2b inserted into the aperture 4a is forced to move inwardly toward the central plane "M" (see FIG. 2) as arrows "Q". As a result, the aperture 4a (especially the inner side face 4b substantially parallel with the central plane "M") is pushed by the inserted portion 2b (especially the part 2f) to deform as arrows "R".

Accordingly, as shown in arrows "Q" and "R", the end portion 2b, particularly the end part 2f, strongly contacts with the inner surface 4b of the aperture 4a. Thus the separate body 4 may be engaged to the main body 10 with a much greater strength to secure the air-tightness or the sealing between them.

Further in the present embodiment of the invention, the main body of a tire including the carcass ply is separated from the separate body 4 having the bead portion 6. The main body of the tire may be easily engaged with the rim main body 12, compared with a conventional tire.

FIG. 11(a) shows diagrams each depicting each stage for fabricating a conventional tire onto a rim. FIG. 11(b) shows diagrams each depicting each stage for fabricating the tire of the inventive embodiment onto a rim.

As shown in FIG. 11(a), a conventional tire 2 has a carcass ply 2 and two beads 6a and 6b as an integral body. The beads are hard and thus difficult to stretch. Therefore, for fabricating such conventional tire 2 onto a rim 10, one end of the bead 6a is engaged onto the rim 10. The other end of the bead 6a is then held and pulled for stretching the bead 6a using a lever (stage 1). Then, the other end of the bead 6a is engaged onto the rim 10 (stage 2). The carcass ply 2 is then moved downwardly so that the bead 6b is located near the rim 10 (stage 3). Next, one end of the bead 6b is engaged onto the rim 10. The other end of the bead 6b is then held and pulled for stretching the bead 6b using a lever (stage 4). Finally, the other end of the bead 6b is engaged onto the rim 10. The above process for fabricating a conventional tire onto a rim includes the two separated stages (1) and (4), in which the hard beads 6a and 6b are stretched using a lever. Such troublesome stretching stages (1) and (4) are not carried out consecutively.

On the other hand, a tire 2 according to the invention may be mounted onto a rim as shown in FIG. 11(b). In such tire, a rim has one main body 10 and two separate bodies 4. Each separate body 4 has a bead embedded therein. First, the position of such tire 2 is adjusted so that one end of the tire 2 is located near a rim flange (stage 1). The one end of tire 2 is then stretched (stage 2). In this case, the tire of the present embodiment does not have a bead 6 and thus may be easily stretched. The tire is then engaged onto a main body 10 of a rim (stage 3). One separate body 4 is then stretched using a lever and engaged on the one end of the main body 10 (stage 4). The other separate body 4 is then stretched using a lever and engaged on the other end of the main body 10 (stage 5). Therefore, the stages 4 and 5 for stretching the respective hard beads using a lever, which are troublesome as described above, may be carried out consecutively and without interruption. Such tire of the inventive embodiment may be thus fabricated onto a rim 12 easier than a tire of a prior art.

Moreover, a tire of a prior art has two bead cores embedded therein. The two bead cores are positioned in parallel with each other. It is thus necessary to provide a drop (recess) for fabricating the parallel bead cores onto a rim. In the present embodiment, the bead cores are not necessarily parallel with each other all the time. The tire of the embodiment does not require the drop for fabricating bead cores onto a rim, thus providing freedom of selection when designing the shape of a rim.

Since a separate body 4 and a bead embedded within the separate body are separated from a tire wheel (main body), the body 4 and the bead may be repeatedly utilized. When a tire wheel (main body) is out of use, such tire main body alone may be separated from the separate body 4 and bead and treated for recycling. Moreover, a conventional tire has metal bead wires embedded therein, which have presented problems when recycling or firing such tires. Such metal bead wire may be separated from the tire main body in the present embodiment. Therefore, the separated metal bead wire does not present difficult problems when recycling or firing the tire main body. The tire of the embodiment is therefore excellent in the viewpoint of environmental protection.

In a preferred embodiment, the end portions of a carcass ply constitute bead portions, in which bead cores are inserted, respectively. That is, it is not necessary to insert each bead core within each separate body as described above. In this case, at least the bead portion is held and fixed within a rim.

In the present embodiment, more preferably, a carcass ply has connecting portions each extending from each bead portion substantially in the direction of tire width. At least a part of the connecting portion is held and fixed by means of a rim.

In the embodiment, more preferably, a rim has a main body provided inside of a carcass ply (with respect to the center axis), and separate bodies. At least a part of the separate body is provided outside of the bead portions of the carcass ply.

More preferably in this embodiment, a carcass ply has a neighboring portion adjacent to the end portion of the carcass ply. The neighboring portion is not held in a rim. The neighboring portion has an outer surface whose center of curvature, viewed in a cross section perpendicular to the circumference of a tire, is located outside of the carcass ply (with respect to the wheel center axis of a tire). The cross section includes the center axis. The radius of curvature "r" of the outer surface and its preferable numerical range were already described. As described above, the starting angle θ may preferably be small. Preferable numerical range of θ was described.

In a preferred embodiment, the carcass ply is contacted with a separate body and main body. A length of the contacted region of the carcass ply and the separate body in the direction of tire width is larger than a length of the contacted region of the carcass ply and the main body in the direction of tire width.

In a preferred embodiment, a bead portion has a protruding portion protruding inside of the main portion of the carcass ply with respect to the central wheel axis of a tire. A bead core is inserted within the protruding portion.

The preferred embodiments of the invention will be described below, referring to FIGS. 12 to 23.

FIG. 12 is a cross sectional view of an assembly according to the invention cut along a plane including the center axis "D". FIG. 13(a) is a partially-broken perspective view showing an end portion 14a and its adjacent region of a carcass ply 14. FIG. 13(b) is a cross sectional view of the end portion 14a and the adjacent region of the carcass ply 14. FIG. 14 is a cross sectional view showing the end portion 14a of the carcass ply 14, a main body 10A and a separate body 16, before the end portion 14a is held between the main body 10A and the separate body 16. FIG. 15 is a cross sectional view showing the end portion 14a of the carcass ply 14 held between the main body 10A and the separate body 16. FIG. 16 is a cross sectional view of the assembly of FIG. 15 for explaining how stress is induced in the assembly when a pneumatic tire is inflated with air. FIG. 17(a) is a cross sectional view of the end portion of the assembly showing the first stage of the pull-out of the bead portion from the rim. FIG. 17(b) is a cross sectional view of the end portion of the assembly showing the second stage of the pull-out of the bead portion from the rim. FIG. 18 is a cross sectional view of the end part of the assembly for explaining how the pull-out of the bead portion from the rim is prevented according to the embodiment of the invention.

As shown mainly in FIG. 12, in the present embodiment, a carcass ply 14 is fixed onto a rim 12A to constitute an assembly 30A. The carcass ply 14 has ply cords 15 and a ply coating 14b covering the ply cords 15. A tread, side wall, inner liner etc. are not shown in FIG. 12.

As shown in FIG. 13, ring-shaped bead portions 14a are provided in the ends of the carcass ply 14. The bead portion 14a has a cross section of a rectangular shape cut along a radial plane with respect to the center axis in the present embodiment. The cross section of the bead portion is not particularly limited and may be a polygonal shape, such as triangle, elliptical shape or the like. An elongate bead core 17 is inserted within the bead portion 14a. The bead core 17 is elongated circumferentially around a tire. The end portions 15a, 15b and 15c of ply cords 15 are bent or wound within the bead portion 14a, as shown in FIG. 13b. The end portions are wound around the bead core 17 and surround it. In other words, the ply cords 15 have winding portions 15a, 15b and 15c around the bead core 17 within the bead portion 14a.

A rim 12A has an inner rim (main body) 10A and two ring-shaped outer rims (separate bodies) 16, which are to be engaged to the end portions 10c of the main body 10A. When fixing the carcass ply 14 onto the rim, as shown in FIG. 14, the end portions 14a of the carcass ply 14 are stretched and are mounted on the flange portions 10d and 10c of the main body 10A. The ring-shaped separate body 16 is mounted on the bead portion 14a. The separate body 16 and main body 10A may be fixed or engaged with each other by means of any method, including a mechanical fixing method using, for example, bolts, nuts or screws, welding or the like. As shown in FIG. 15, after fixing the separate body onto the main body, the bead portion (end portion) 14a of the carcass ply is held and fixed by means of the rim 12A.

In the present embodiment, a connecting portion 14c extending from the bead portion is also held between the main body and separate body. That is, the flange portion 10d of the main body 10 extends in a radial direction with respect to the center axis to provide a fixing portion 10b. As shown in FIG. 15, a narrow space 20 is formed between the fixing portion 10b and separate body 16. The connecting portion 14c is inserted in the narrow space 20 and held between the fixing portion 10b and separate body 16 so that the bead portion may be further firmly grasped. 14b is a main portion of the carcass ply.

Further, in the present embodiment, as shown in FIG. 15, a length "F" is larger than a length "E". "F" is a length (dimension in the direction "B" of tire width) of the contacted region of the carcass ply 14a and the separate body 16. "E" is a length (dimension in the direction "B" of tire width) of the contacted region of the carcass ply 14a and the main body 10A.

Further, the carcass ply 14 has a neighboring portion 14h adjacent to the end portion 14a. The neighboring portion 14h is not held in the rim. The neighboring portion 14h has an outer surface 32. The center of curvature "O" of the surface 32, viewed along a cross section perpendicular to the circumferential direction of the tire, is located outside A1 of the carcass ply 14 with respect to the center axis. The outer surface (curve) 32 has a relatively small radius of curvature "r", as described above.

Further, the neighboring portion 14h extends from the connecting portion 14c in a direction intersecting the direction "B" at a starting angle θ. The angle θ is defined as a angle between the curve of the inner surface of the carcass ply 14 and the direction "B" of tire thickness, measured at a point "P" where the carcass ply and rim meet.

The technical advantages of the assembly according to the present embodiment will be described below. Generally speaking, the inventive pneumatic tire takes its maximum width on a rim. In other words, a circumferential plane perpendicular to a radial direction of the pneumatic tire and in which the width of the tire is maximum lies within a rim. When such type of pneumatic tire is inflated by applying inner pressure, a stress is induced in the tire so that the bead portions are pulled inwardly in the direction "B2" of tire thickness, as shown in FIG. 2. For example, in the assembly shown in FIG. 2, the bead portions 6 are pulled inwardly in the direction "B2" of tire width due to the stress. Such stress is utilized to mechanically engage and fix the main body 10 and separate body 4 with each other, as described above.

On the other hand, in the embodiment shown in FIG. 16, when air is introduced into a pneumatic tire by applying pressure, the neighboring portion 14h and main portion 14b of the carcass ply 14 are pushed by air pressure as arrows "H" from inside of the carcass ply. A tensile stress for pulling the main portion 14b of the carcass ply is also applied as an arrow "G" simultaneously. Consequently, the bead portion 14a tends to be pulled out from the rim 12A.

The bead portion and rim according to the present embodiment are effective for preventing the pull-out of such bead portion from the rim. The reasons will be described. When air pressure is applied as arrows "H" and tensile stress is applied as an arrow "G" on the neighboring portion 14h and main portion 14b, such air pressure and tensile stress tend to cause the pull-out of the bead portion 14a from the rim 12A. Such pull-out may be effectively prevented by holding and fixing the bead portion between the main body 10A and separate body 16, which are separate physical entities. Moreover, in the present invention, the bead portion 14a has a protruding portion 33 protruding inside of the carcass ply 14 toward the center axis. The protruding portion 33 has three elongate faces 14d, 14e and 14f, which are contacted with the rim 12A and fixed, as well as an elongate face 14g. Such fixing of the four elongate faces further prevents the pull-out of the bead portion 14a from the rim 12A when applying inner pressure in the pneumatic tire, according to the following reasons.

When inner pressure is applied in the tire, stress is induced on the carcass ply as arrows "H" and "G". It is therefore necessary to apply stress on the outer face 14g, formed outside of the end portion 14a, as an arrow "J" to prevent the pull-out of the carcass ply. Consequently, stress as arrows "H" and "J" are applied on the carcass ply, simultaneously, to induce a torque as an arrow "L" as shown in FIG. 16. In the present invention, the bead portion has the above described protruding portion 33, whose inner face 14d is fixed by the rim 12A as an arrow "K" to prevent the rotation of the bead portion 14a.

Further, in another preferred embodiment, a carcass ply has ply cords winding or bending around a bead core within a protruding portion.

Further, in a preferred embodiment, a bead core has a spring constant in the circumferential direction of a tire, which is smaller than that of the tire in the direction of tire thickness. The bead core may preferably be made of a metal spring or a thermoplastic resin. Such technical features are also effective for preventing the pull-out of the bead portion 14a from a rim. The reasons will be described below.

The inventors have studied various techniques for improving the bonding strength of a bead portion to a rim. On the viewpoint of dynamics, when inner pressure is applied in a pneumatic tire, equilibrium of forces "H", "J" and "K" is maintained as shown in FIG. 16. The equilibrium seems to sufficiently prevent the pull-out of the bead portion from the rim. However, the following phenomenon has been observed. That is, a large tensile stress may be applied on the carcass ply. Moreover, the bead portion 14a may be made of a material that may be easily deformed (for example, the bead portion is made of a rubber alone). In this case, there is a possibility that the bonding strength of the bead portion 14a to a rim might not be sufficiently large.

The inventors have observed the detailed mechanism of the pull-out of a bead portion from a rim, and finally found the following mechanism. That is, the pull-out of the bead portion 14a form the rim due to its elastic deformation proceeds through a basic mechanism, which will be described referring to FIGS. 17(a) and 17(b). Concretely, when the carcass ply is pulled, the connecting portion 14c is stretched as an arrow "L" (step I). Responsive to the stretching, the faces 14f, 14e and 14d of the bead portion 14a are lifted from the inner wall faces of the rim as arrows "M" (step II). When the process further proceeds, spaces between the faces 14f, 14e and 14d of the bead portion and the inner wall faces of the rim are enlarged as arrows "N". Such enlargement of the spaces may also cause the rotation of the bead portion (step III). Simultaneously, a considerable amount of the weight of the bead portion moves outwardly toward the outer surface of the carcass ply. Such movement may induce the compressive deformation of the bead portion in the narrow portion 20 as arrows "Q" (step IV).

The inventors have found that the above process may be effectively prevented by applying a bead portion with the shape shown in FIG. 18. That is, ply cords 15 are wound or bent around a bead core 17 to form winding portions 15a, 15b and 15c within the protruding portion 33. The end portions 15a, 15b and 15c of ply cords 15 are thus strongly engaged and fixed by means of the bead core 17. The ply cords themselves may not be subjected to elastic deformation, thereby preventing the stretching of the carcass ply as an arrow "L" (step I) and the rotation of the whole bead portion (step III). Moreover, the bead core 17 is surrounded and held by the end portions of the ply cords. When the ply cords are pulled as an arrow "L", the bead core 17 held by the ply cords is thus pulled toward the separate body 16 (in the outer direction "A1") as an arrow "R". Consequently, the pressure of the outer face 14g of the bead portion 14 on the inner surface of the separate body 16 is increased. The friction coefficient of the sliding movement of the outer face 14g on the contacted inner surface of the separate body 16 is thereby increased, preventing the deformation of the bead portion including the sliding movement as an arrow "S". Consequently, the lift "M" in the step "II" may be also prevented.

Further, the bead core has a relatively large spring constant in the direction of tire thickness and may not be easily deformed. The bead portion, including the core, is also resistive against the compressive deformation as a whole, thus preventing the process of step "IV".

The spring constant of a bead core in the circumference of a tire is not particularly limited. A bead core may preferably be flexible in the circumference. A predetermined inner pressure within a pneumatic tire may thereby securely be maintained, while alleviating the necessity of a drop portion in a rim to enable run-flat running. From this viewpoint, the spring constant of a bead core in the circumferential direction of a tire may preferably be not higher than 15 N/mm, and more preferably be not higher than 12 N/mm.

On the other hand, for securely maintaining the inner pressure within a pneumatic tire or for providing the resistance against a higher inner pressure, the spring constant of a bead core in the circumferential direction of a tire may preferably be higher. On the viewpoints, the spring constant may preferably be not lower than 5 N/mm, and more preferably be not lower than 8 N/mm.

A bead core may be made of any material being not particularly limited. The material may preferably be a metal spring, or a thermoplastic resin having desired spring constants provided by the heat treatment of the resin. The thermoplastic resin includes nylon, polypropylene and polyethylene.

When a bead portion is made of a metal spring, the cross sectional shape and dimensions of the metal wire constituting the spring may be adjusted, so that the spring constant in the circumferential direction becomes small and the spring constant in the direction of tire thickness becomes large. For example, FIGS. 19(a) and 19(b) show the cross sectional shapes of metal wires each cut along a plane perpendicular to a radial direction of a tire (cut along the circumference). As shown in FIG. 19(a), "A" is a radial direction of a tire, "B" is a direction of tire width, and "C" is the circumferential direction of a tire. The dimension "f" of each of the metal wires 24A and 24B in the direction of tire thickness "B" is larger than that the dimension "e" in the circumference "C". The spring constant of each of the metal springs in the circumference "C" thereby becomes relatively small, and the spring constant of each of the metal springs in the direction of thickness "B" thereby becomes relatively large. From this point of view, "f/e" may preferably be not lower than 1.2, and more preferably be not lower than 1.5. Further, the cross sectional shape of each metal wire 24A and 24B may preferably be a rectangular or elliptical shape rather than square or complete round.

An example of a concrete design will be described. The following dimensions are preferred when a steel wire made of a spring steel (SWP) is used.

| | |
|---|---|
| "f" | 1.8–2.0 mm |
| "e" | 1.0–1.2 mm |
| "f/e" | preferably not lower than 1.2; more preferably not lower than 1.5. |
| "spring pitch" | 1.5–2.0 mm |
| "outer diameter of a spring" | 6.0–7.0 mm |

FIGS. 20 to 23 are cross sectional views each showing a engaging or holding structure of a bead portion according to each embodiment. In the example shown in FIG. 20, a fixing member 21 such as a bolt is further utilized for fixing the separate body 16 to the flange portion 10c of the main body 10A. In the example shown in FIG. 21, the bead portion 14a has a protruding portion 33 having a cross sectional shape similar to a triangle. The bead portion 14a has an elongate face 14j contacting the flange portion 10e of the main body. Two elongate faces 14f and 14g contact the inner wall surface of the separate body 16. Further, although a considerable portion of the bead core 17 is within the protruding portion 33, the remaining outer (upper) portion of the bead core 17 is out of the protruding portion 33.

The example shown in FIG. 22 is substantially same as that shown in FIG. 20. However, in the example of FIG. 22, the bead portion 14a has a protrusion 14k, which is engaged with the inner wall surface of the separate body 16. Although the protrusion 14k is formed on the outer face 14g in the present example, the protrusion may be formed on each of another wall faces 14f, 14e and 14d. When the above described tensile stress and torque are applied on the bead portion 14a of the carcass ply, the protrusion 14k prevents the rotation of the bead portion, thereby preventing the pull-out of the bead portion 14a from the rim.

The example shown in FIG. 23 is substantially same as the example shown in FIG. 22. In the example of FIG. 23, however, an embedded object 23, made of a hard rubber, is further embedded outside of the bead core 17 with respect to the center axis. In other words, the object 23 is embedded in the outer part (upper part in the FIG. 23) of the bead portion 14a. The embedded object 23 functions to further reduce the compressive deformation of the bead portion described in the step "IV".

The embedded object 23 may be made of any material not particularly limited, which may be a rubber containing a thermoplastic resin being hardened and cured. Further, the hard rubber may preferably has a Young's modulus not lower than 10 MPa.

Experimental results will be described below. The assemblies shown in FIGS. 20, 21, 22 and 23 were fabricated. The tire size was "280/25R21". The separate body and main body were made of aluminum. The ply cords 15 were made of polyethylene terephthalate. The bead core was made of a metal spring. The details of the metal spring were as follows.

| | |
|---|---|
| Material | Spring steel (SWP) |
| Cross section | Rectangular |
| "e" | 1.2 mm |
| "f" | 2.0 mm |
| "f/e" | 1.67 |
| Spring pitch | 1.5 mm |
| Outer diameter of spring | 7.0 mm |

Water was introduced into each tire assembly until the sealing structure of the end portion of the carcass ply was broken. The pressure of water when the structure was broken was measured. The results will be shown below.

| | |
|---|---|
| FIG. 20: | 1350 kPa |
| FIG. 21: | 1380 kPa |
| FIG. 22: | 1740 kPa |
| FIG. 23: | 2002 kPa |

As described above, the inventive assemblies may provide the resistance against inner pressure comparable to that of an assembly of a prior art.

As described above, the inventive assembly may reduce the rolling resistance of a tire considerably when a tire is rolling.

What is claimed is:

1. An assembly of a pneumatic tire and a rim, said pneumatic tire comprising;
   at least one carcass ply composed of a plurality of ply cords and comprising two end portions, and
   a belt layer composed of belt cords, said belt layer being provided outside of said carcass ply, each belt cord extending in a direction intersecting said ply cords,
   wherein each of said end portions is held in said rim and wherein said pneumatic tire has a single maximum width in a circumferential cross section with a cylindrical shape with respect to a center axis of said pneumatic tire, said cross section extending through said rim, and
   wherein said carcass ply comprises two neighboring portions which are adjacent to said end portions of said carcass ply and are not held in said rim, and said neighboring portions have an outer surface whose center of curvature, viewed in a cross section including said center axis of said tire, is located outside of said carcass ply with respect to the center axis of said tire.

2. The assembly of claim 1, wherein said rim comprises rim flanges and each of said end portions of said carcass ply is fixed on each of said rim flanges.

3. The assembly of claim 2, wherein said rim comprises a main body and at least one separate body, and wherein at least one of said end portions is held between said main body and said separate body.

4. The assembly of claim 3, wherein said main body is provided inside of said carcass ply with respect to said center axis of said tire, and wherein at least a part of said separate body is provided outside of said end portion with respect to said center axis.

5. The assembly of claim 4, wherein said main body is constructed based on an industrial standard of a rim.

6. The assembly of claim 4, wherein said main body comprises said rim flanges and wherein said separate body surrounds at least a part of said rim flange.

7. The assembly of claim 6, wherein at least a part of said rim flange is inserted into an aperture formed in said separate body.

8. The assembly of claim 7, wherein said separate body comprises bead portions.

9. The assembly of claim 4, wherein said separate body comprises bead portions.

10. The assembly of claim 1, wherein said rim comprises a main body and at least one separate body, and wherein at least one of said end portions is held between said main body and said separate body.

11. The assembly of claim 10, wherein said separate body comprises bead portions.

12. The assembly of claim 1, wherein said carcass ply comprises a main portion, bead portions provided in said end portions and bead cores inserted within said bead portions, respectively.

13. The assembly of claim 12, wherein said bead portion comprises a protruding portion protruding inside of said carcass ply toward said center axis of said tire, said bead portion being inserted within said protruding portion.

14. The assembly of claim 13, wherein said ply cord is wound around said bead core within said protruding portion.

15. The assembly of claim 13, wherein said carcass ply comprises a connecting portion extending in a direction substantially parallel with the center axis of said tire from said bead portion and wherein at least a part of said connecting portion is held in and fixed with said rim.

16. The assembly of claim 12, wherein said carcass ply comprises a connecting portion extending in a direction substantially parallel with the center axis of said tire from said bead portion and wherein at least a part of said connecting portion is held in and fixed with said rim.

17. The assembly of claim 12, wherein said rim comprises a main body and at least one separate body, and wherein at least one of said end portions is held between said main body and said separate body.

18. The assembly of claim 17, wherein said main body is provided inside of said carcass ply with respect to said center axis and wherein at least a part of said separate body is provided outside of said end portion with respect to said center axis.

19. The assembly of claim 18, wherein said end portion comprises a protrusion engaged with the inner wall of said main body.

20. The assembly of claim 18, wherein said end portion comprises a protrusion engaged with the inner wall of said separate body.

21. The assembly of claim 18, wherein said carcass ply is contacted with said separate body and said main body, and wherein a length of the contacted region of said carcass ply and said separate body in the direction of tire width is larger than a length of the contacted region of said carcass ply and said main body in the direction of tire width.

22. The assembly of claim 12, wherein said bead core has a spring constant in the circumference of said tire and a spring constant in the direction of tire width, said spring constant in the circumference being smaller than said spring constant in the direction of tire width.

23. The assembly of claim 12, wherein said bead core is a metal spring.

24. The assembly of claim 22, wherein said bead core is a metal spring.

25. The assembly of claim 22, wherein said bead core is made of a thermoplastic resin.

26. The assembly of claim 1, wherein a starting angle θ is less than or equal to 45°, wherein said starting angle θ is defined as an angle between the inner surface of said carcass ply and the direction of tire thickness "B", measured at a point "P" where the carcass ply and rim meet each other.

27. The assembly of claim 1, wherein said outer surface has a radius of curvature "r" which is less than or equal to 50 mm.

28. The assembly of claim 1, wherein said neighboring portion is deformed inwardly when a stress is applied on said tire toward said center axis of said tire.

29. A pneumatic tire to be fixed on a rim, said pneumatic tire comprising;
   at least one carcass ply composed of a plurality of ply cords and comprising two end portions, and
   a belt layer composed of belt cords, said belt layer being provided outside of said carcass ply, each belt cord extending in a direction intersecting said ply cords,
   wherein said pneumatic tire has a single maximum width in a circumferential cross section with a cylindrical shape with respect to the center axis of said pneumatic tire, said tire being to be fixed on said rim so that said cross section extends through said rim, and
   wherein each of said end portions is held in said carcass ply comprises two neighboring portions which are respectively adjacent to said end portions of said carcass ply and are not held in said rim, and said neighboring portions have an outer surface whose center of curvature, viewed in a cross section including said center axis of said tire, is located outside of said carcass ply with respect to the center axis of said tire.

30. The tire of claim 29, comprising a reinforcing layer provided within said end portion of said carcass ply.

31. The tire of claim 30, wherein said reinforcing layer extends in a direction intersecting said ply cord.

32. The tire of claim 31, wherein said reinforcing layer is made of steel cords.

33. The tire of claim 29, wherein said carcass ply comprises a main portion, bead portions provided in said end portions and bead cores inserted within said bead portions.

34. The tire of claim 33, wherein said carcass ply comprises a connecting portion extending in a direction substantially parallel with the center axis of said tire from said bead portion and wherein at least a part of said connecting portion is to be held in and fixed with said rim.

35. The tire of claim 33, wherein said bead core has a spring constant in the circumference of said tire and a spring constant in the direction of thickness of said tire, said spring constant in said circumference being smaller than said spring constant in said direction of thickness.

36. The tire of claim 33, wherein said bead core is a metal spring.

37. The tire of claim 35, wherein said bead core is a metal spring.

38. The tire of claim 35, wherein said bead core is made of a thermoplastic resin.

39. The tire of claim 29, wherein a starting angle θ is less than or equal to 45°, wherein said starting angle θ is defined as an angle between the inner surface of said carcass ply and the direction of tire thickness "B", measured at a point "P" where the carcass ply and rim meet each other.

40. The tire of claim 29, wherein said outer surface has a radius of curvature "r" which is less than or equal to 50 mm.

41. The tire of claim 29, wherein said neighboring portion is deformed inwardly when a stress is applied on said tire toward said center axis of said tire.

* * * * *